United States Patent [19]
Atkins

[11] Patent Number: 5,699,416
[45] Date of Patent: Dec. 16, 1997

[54] METHOD FOR OBTAINING BILLING VALIDATION OF DIRECTORY NUMBER ACCOUNTS FROM LINE IDENTIFICATION DATABASES IN A TELECOMMUNICATIONS NETWORK

[75] Inventor: Jean Atkins, Naperville, Ill.

[73] Assignee: AT&T Corp., Middletown, N.J.

[21] Appl. No.: 539,384

[22] Filed: Oct. 5, 1995

[51] Int. Cl.[6] .................. H04M 15/60; H04M 3/42; H04M 7/00
[52] U.S. Cl. .................. 379/127; 379/115; 379/112; 379/121; 379/201; 379/207; 379/221
[58] Field of Search .................. 379/112, 114, 379/115, 116, 119, 126, 121, 127, 201, 207, 221, 111

[56] References Cited

U.S. PATENT DOCUMENTS

| | | | |
|---|---|---|---|
| 4,754,479 | 6/1988 | Bicknell et al. | 379/207 |
| 5,046,183 | 9/1991 | Dorst et al. | 370/110.1 |
| 5,222,125 | 6/1993 | Creswell et al. | 379/114 |
| 5,287,403 | 2/1994 | Atkins et al. | 379/144 |
| 5,452,351 | 9/1995 | Yamamoto | 379/115 |
| 5,475,749 | 12/1995 | Akinpelu et al. | 379/207 |
| 5,481,603 | 1/1996 | Gutierrez et al. | 379/221 |

OTHER PUBLICATIONS

"Completing Telecommunications Calls In A Competitive Local And Toll Environment", Patent Application—A. A. Akinpelu 4–5–4–2–2–2–7–4–2 with a filing date of Mar. 27, 1995. Akinpelu, A.A; Bhagat, P.K.; Garoutte, D.L.; Hatalla, A.; Hirsch, R.B.; Krisht, A. H.; Lee, C.; Shepard, J. B.; Stanley, D. V.; Stern, T. L.

Primary Examiner—Curtis Kuntz
Assistant Examiner—Paul Loomis
Attorney, Agent, or Firm—Samuel H. Dworetsky

[57] ABSTRACT

A method for selecting one of a plurality of line identification (ID) databases for validation of an operator-assisted call billed to a ported directory number account comprises determining whether billing information received from a caller is directory number-based. If the billing information is directory number-based, an operator services system (OSS) queries a number portability database to retrieve available routing information associated with billing information provided by the caller. The routing information is used to access a billing acceptance database which stores a list of those service providers which allow the OSS to access their customer data. If the OSS is able to access an identified service provider's data, the routing information received from the number portability database is used to route a billing validation request to a selected one of the plurality of line ID databases.

6 Claims, 2 Drawing Sheets

METHOD FOR OBTAINING BILLING VALIDATION OF DIRECTORY NUMBER ACCOUNTS FROM LINE IDENTIFICATION DATABASES IN A TELECOMMUNICATIONS NETWORK

TECHNICAL FIELD

This invention relates to the field of telecommunications networks and, more particularly, to accessing a particular line identification database to obtain billing validation of a ported directory number account from an operator services system in such telecommunications networks.

BACKGROUND OF THE INVENTION

The United States telecommunications industry is in a state of transition. During the next several years, it is expected that the monopoly held by local exchange carriers (LECs) will be substantially altered, and that competitive access providers (CAPs) will begin to offer customer service for both toll and local exchange calls. To facilitate the transition without creating an excessive burden on customers who wish to become CAP subscribers, a requirement for service provider number portability, defined as a change in service provider without a change in directory number, is anticipated. Eventually, location number portability will also be available so that customers can move to other geographic locations without a change in directory number.

Number portability, regardless of type, significantly impacts call routing in the existing network. This is because calls between telephone customers in the United States are established on the basis of a national directory number plan, wherein each customer line is identified by a ten-digit directory number that has geographic and central office switch significance. The ten-digit directory number comprises a three-digit area code (generally denoted by the letters "NPA") defining a specific geographic region, which is followed by a three-digit office code (denoted by the letters "NXX") identifying a particular central office switch in the network. The office code is followed by a four-digit customer line identifier (denoted by the letters "XXXX") establishing the line address of a particular customer line served by the central office switch identified by the NXX digits of the directory number. Customers who change service providers while retaining their directory number are served by a central office switch which normally serves NPA-NXX digits different than the NPA-NXX digits of the customer's directory number. In other words, such customers have "ported" their directory numbers.

An exemplary proposal for accommodating ported directory numbers in the existing network is described in commonly assigned, co-pending U.S. patent application Ser. No. 08/410,585 to Akinpelu et al. (hereinafter, the "Akinpelu et al. application"). The Akinpelu et al. application describes retrieving a location routing number (LRN) from a number portability database to ensure proper routing of a call destined for a ported directory number. In the preferred embodiment of the Akinpelu et at. application, the LRN resembles a traditional ten digit directory number because the first six digits of the LRN identify a single central office switch in the network and correspond to NPA-NXX digits. Unlike conventional directory numbers, however, the remaining four digits do not identify a customer line address but, instead, indicate that an initial address message (IAM) parameter should be accessed to obtain the customer line address.

Although the Akinpelu et al. application minimizes the overall inconvenience and impact of number portability on the current network by using NPA-NXX digits to identify central office switches that serve ported directory numbers. it does not address the impact that number portability has on another important component of the network which conventionally uses directory numbers for processing. Particularly, operator-assisted calls are handled by an operator services system (OSS) to accommodate various call billing arrangements including calls billed to a called party (a "collect call"), calls billed to a third party, and calls billed to a calling card. Ported directory numbers complicate OSS processing since billing verification is dependent upon routing a billing validation request to a line identification (ID) database based on the directory number to be billed. Commonly issued directory number-based calling cards are also validated by using a directory number to route a request to a line ID database. Non-directory number based calling cards are validated by accessing a card validation database, and are not affected by number portability.

Line ID databases typically contain all billable directory number accounts maintained by a particular service provider. In the current network, an entire NPA-NXX is normally assigned to a single service provider. Thus, the six NPA-NXX digits of a billing directory number can be used to determine the address of the line ID database containing the information for that service provider's directory numbers. As CAPs enter local telecommunications markets, however, they may choose to maintain their own line ID databases or, choose to use a line ID database shared with other service providers. Number portability implies that directory numbers with the same NPA-NXX will be served by multiple service providers.

A problem arises when them are a plurality of line ID databases which may be accessed by an OSS, and the directory number account to be billed is identified by a ported directory number. This is because network OSSs are incapable of determining the proper line ID database to access for billing validation when billing is directed to a ported directory number account. For example, in the current system, if an OSS attempts to retrieve billing validation of a ported directory number account by routing the validation request to a line ID database on the basis of the NPA-NXX digits of the billing directory number, it will receive an "invalid number" response from the database because the authorization for billing data of the ported directory number account has been transferred to another service provider's line ID database.

Since validating all types of billing to ensure receipt of revenue is a primary objective of every service provider, the inability to bill and receive revenue for calls billed to ported directory number accounts is an unacceptable result. To properly bill calls to ported directory number accounts, an OSS must be capable of efficiently and accurately determining the line ID database that contains the authorization for billing data associated with the directory number account to be billed. Therefore, there is a need in the art for consistently choosing the appropriate one of a plurality of line ID databases from which to receive billing validation for ported directory number accounts for operator-assisted calls placed in a telecommunications network.

SUMMARY OF INVENTION

This need is addressed and the technological advance is achieved in the telecommunications art by the method and system of the present invention which enables an operator services system (OSS) to accurately route billing validation requests to an appropriate one of a plurality of line ID databases in a telecommunications network.

In the preferred embodiment of the method of the present invention, a call is received in an OSS, and subsequently, the caller is prompted for billing information. If the billing information is directory number-based, validation is a multiple step process. Particularly, if it is determined that the billing information is directory number-based, the OSS accesses a number portability database to obtain any routing information associated with the billing information. The routing information not only identifies a service provider's switch, but also can be used to access other information related to the service provider. If routing information is found in the number portability database, it is retrieved by the OSS and used to access a billing acceptance database to determine whether calls which are billed by the service provider associated with the billing information can be handled by the OSS. A billing validation request is routed to the appropriate one of a plurality of line ID databases in the telecommunications network subsequent to a determination that the OSS is allowed access to the database maintained by the service provider responsible for billing the call.

DETAILED DESCRIPTION

Figure 1:
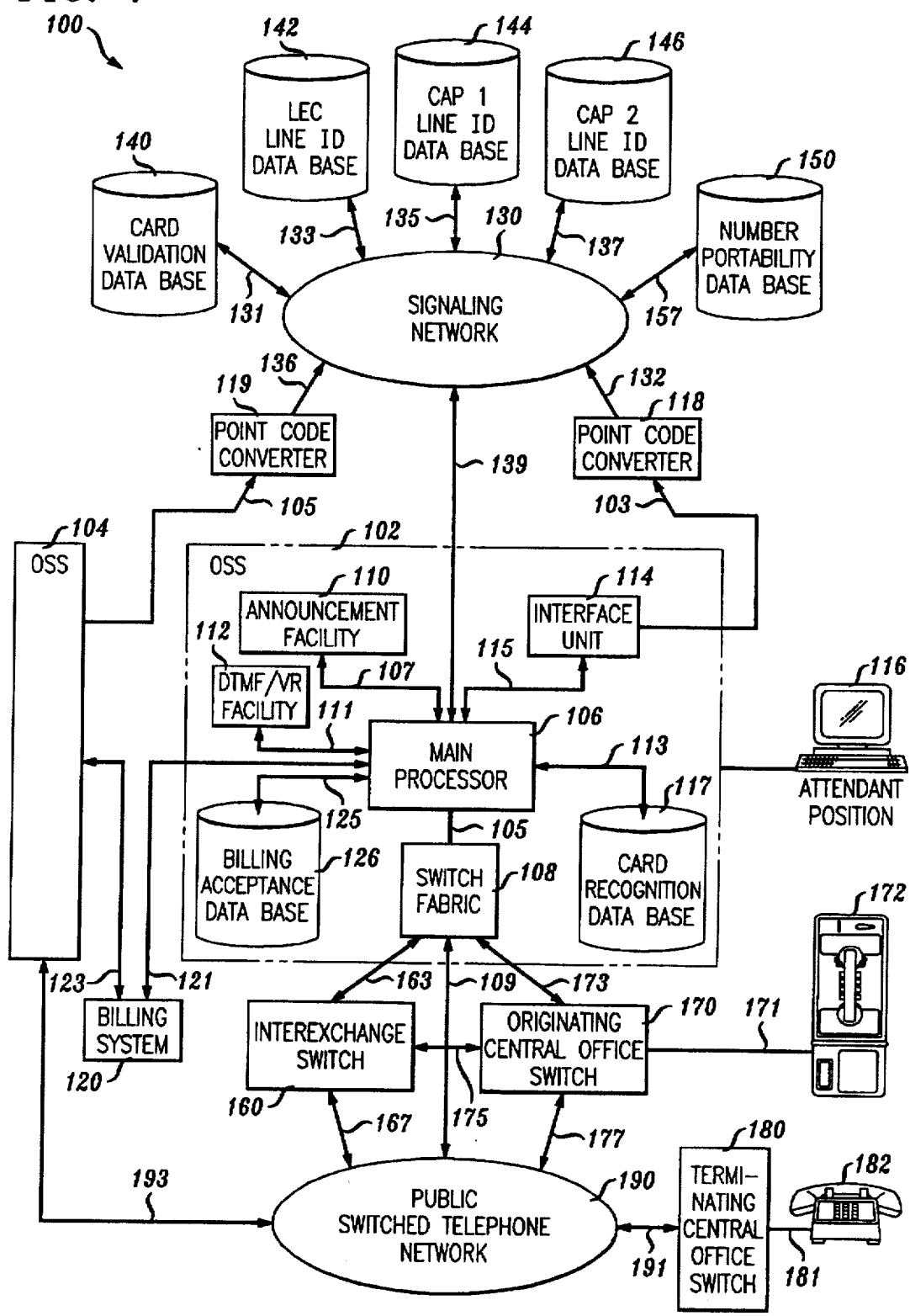
FIG. 1 is a simplified block diagram of a telecommunications network in which the present invention may be practiced.

FIG. 1 shows the preferred embodiment of a telecommunications network in which the present invention may be practiced. Particularly, telecommunications network 100 includes: first operator services system (OSS) 102; second operator services system 104; billing system 120; signaling network 130; card validation database 140; LEC line ID database 142; CAP1 line ID database 144; CAP2 line ID database 146; number portability database 150; interexchange switch 160; originating central office switch 170; terminating central office switch 180; and public switched telephone network (PSTN) 190.

OSS 102 comprises main processor 106 for administering system-wide control functions which is interconnected via system data link 105 to switch fabric 108. Switch fabric 108 serves as an interface between the system and other parts of the network. In the embodiment shown, switch fabric 108 maintains bi-directional trunk connection 109 to PSTN 190. System data link 107 interconnects main processor 106 to announcement facility 110 which stores and issues announcements, as is known in the art. Dual tone multi-frequency (DTMF) and/or voice recognition facility 112 (or any other type of digit collection facility) is interconnected to processor 106 by data link 111, and is responsible for the reception and processing of digits as received from a caller. Card recognition database 117 stores a list of recognized calling card vendors, and is connected by data link 113 to main processor 106. Similarly, data link 125 connects main processor 106 to billing acceptance database 126 which stores information regarding those service providers (identified by NPA-NXX digits) which allow OSS 102 access to their customer databases. Interface unit 114 is connected to main processor 106 by data link 115, and also serves as a conduit for messages sent to and received from point code converter 118 via message link 103. As is known in the art, point code converters are used to convert routing information into a particular network point code address. In the embodiment shown, point code converter 118 is interconnected to signaling network 130 by signaling link 132, and may be used to route billing validation requests to an appropriate line ID database, if necessary. Number portability database 150 is connected to signaling network 130 via signaling link 157 and used by telecommunications network 100 to properly route calls directed to ported directory numbers, as described in the Akinpelu et al. application. In the preferred embodiment of the present invention, the routing information contained in number portability database 150 is used to access billing acceptance database 126, and to select the appropriate one of a plurality of line ID databases to route a billing validation request, as is described below. Attendant position 116 allows a human operator to act as a liaison between a caller and OSS 102, if necessary.

OSS 104 includes the same components as OSS 102, and thus, is not described in detail. Point code converter 119 serves OSS 104 via message link 105, and accesses network 130 via signaling link 136. Although separate point code converters are shown for OSS 102 and OSS 104 in alternate embodiments, the point code converter could be located in the signaling network rather than being associated with any particular OSS. Also, OSS 102 and OSS 104 may maintain separate number portability databases in alternative embodiments. OSS 104 is inter-connected to PSTN 190 by trunk connection 193. Billing system 120 serves both OSS 102 and OSS 104 via data links 121 and 123, respectively. Billing system 120 receives call data (such as the called party's directory number, duration of the call, etc.) relating to each call placed by the operator systems so that billing records can be created, as is known in the art.

Signaling network 130 extends messages between network databases and the OSSs over designated signaling links. The messages are routed to a particular database in accordance with the network address contained in the message. In the embodiment shown, OSS 102 sends and receives messages from signaling network 130 over signaling link 139. Each database also maintains a link with signaling network 130. Particularly, card validation database 140 is inter-connected to signaling network 130 by signaling link 131. LEC line ID database 142 is inter-connected to network 130 by signaling link 133 while CAP1 line ID database 144 and CAP2 database 146 are inter-connected to network 130 by signaling links 135 and 137, respectively. Number portability database 150 is connected to the signaling network by signaling link 157. In the embodiment shown, each line ID database is presumed to be independently controlled, and to contain its own customer directory number account billing authorization data.

Originating central office switch 170 serves public telephone 172 via customer line 171, and is inter-connected to switch fabric 108 of OSS 102 via bi-directional trunk connection 173. Originating switch 170 also maintains bi-directional trunk connection 175 to inter-exchange switch 160 and bi-directional trunk connection 177 to PSTN 190. A caller may access OSS 102, via originating switch 170 and trunk 173, by dialing "0" plus a directory number from public telephone 172 or, by simply dialing "0" to reach an operator. Alternatively, the caller may dial a toll free access number such as "1-800-555-CALL" to access interexchange switch 160 via originating switch 170 and trunk 175. Once the call is received in inter-exchange switch 160, it is extended by the switch to OSS 102 over trunk 163. In the embodiment shown, both interexchange switch 160 and originating switch 170 are served by OSS 102. In practice, however, interexchange switch 160 is more likely to be served by a separate OSS, such as OSS 104. Also shown is terminating central office switch 180 which is interconnected to PSTN 190 via bi-directional trunk 191. In this embodiment, terminating switch 180 serves a called party at telephone 182 via customer line 181.

Figure 2:
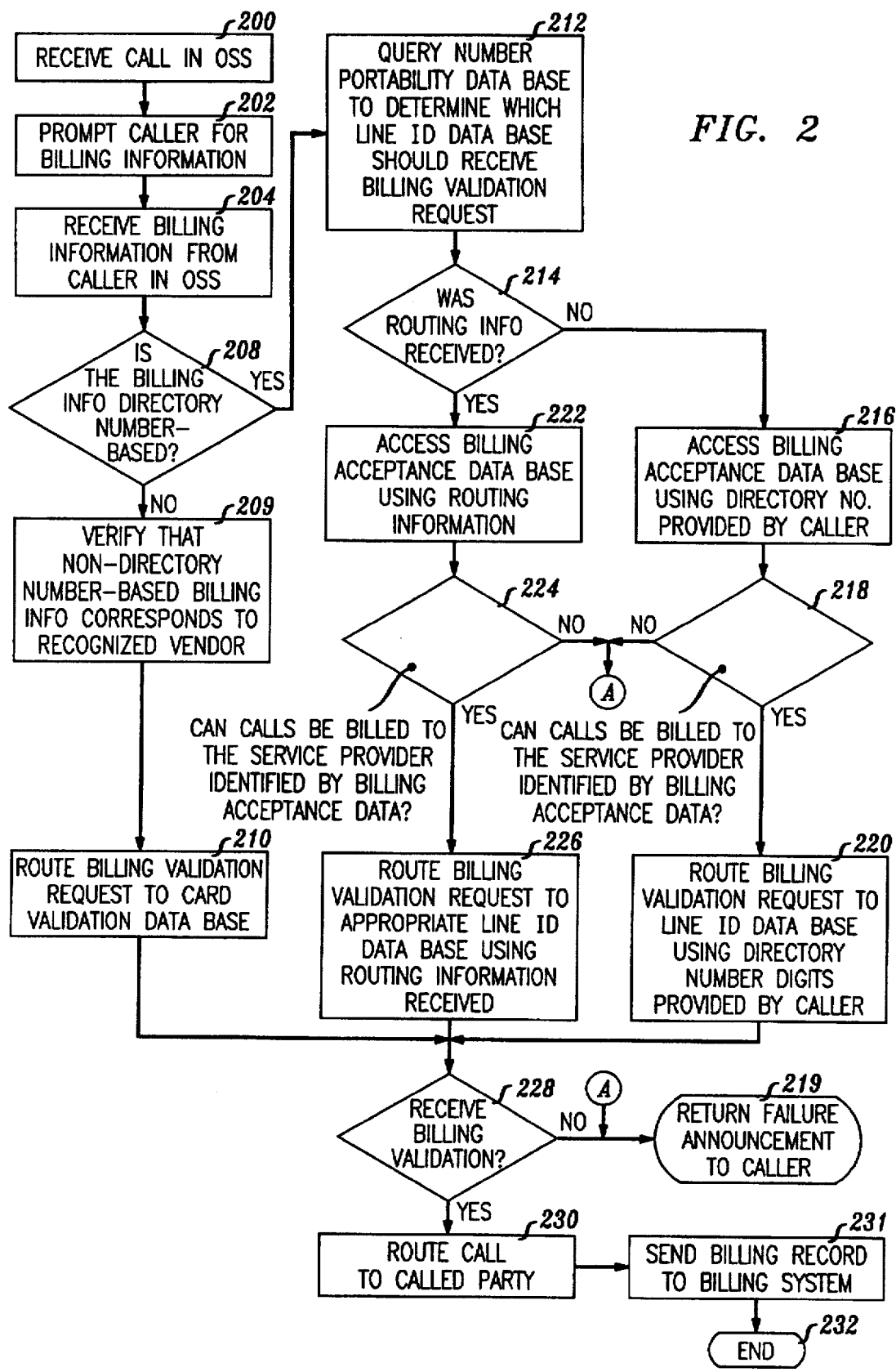
FIG. 2 is a flow diagram of the steps performed in the network of FIG. 1 in accordance of a preferred embodiment of the method of the present invention.

FIG. 2 shows a flow diagram of the steps performed in telecommunications network 100 for billing an operator-assisted call (i.e., a call which is completed via OSS 102 or OSS 104) to a ported directory number account in accordance with the preferred embodiment of the method of the present invention. For purposes of example, assume that a caller at public telephone 172 places a calling card call to a called party at telephone 182 by depressing buttons corresponding to the digits of the directory number which identifies telephone 182 (i.e. the caller enters an "originally dialed directory number"). Also assume that this caller has recently transferred local telephone service from LEC to CAP 2 but has chosen to retain the home directory number "708-555-1234" and a calling card account based on the home directory number.

To bill this particular call, the caller's calling card account number (which is the caller's home directory number "708-555-1234") would normally be used to route a billing validation request to LEC line ID database 142 because the NPA-NXX digits "708-555" correspond to telephone accounts historically served by the LEC. However, since the caller is no longer a LEC customer. Therefore, all records relating to the directory number "708-555-1234" have been deleted from LEC line ID database 142. Accordingly, if a billing validation request directed to the number "708-555-1234" is received by LEC line ID database 142, the database will return an "invalid number" message to the requesting OSS.

As a result of porting, billing authorization data (or a "validation record") corresponding to the directory number "708-555-1234" has been added to CAP2 line ID database 146 because CAP 2 is the caller's new service provider. The billing validation process for the above-described call, in accordance with the preferred embodiment of the present invention, begins in step 200 when OSS 102 receives a call from originating switch 170 via trunk connection 173. Alternatively, the call may have been received over trunk 163 from inter-exchange switch 160. In step 202, OSS 102 prompts the caller for billing information by issuing a command from announcement facility 110. In step 204, OSS 102 receives the billing information from the caller in DTMF and/or voice recognition facility 112, and transmits the billing information to main processor 106 over data link 111.

In decision step 208, main processor 106 determines whether the billing information received from the caller is directory number-based, as is known in the art. If the outcome of decision step 208, is a "NO" decision, it is assumed that the billing information corresponds to a non-directory number-based calling card, and the process continues to step 209. In step 209, OSS 102 accesses card recognition database 117 and verifies that the card number is issued by to a recognized calling card vendor. The process continues to step 210 in which a billing validation request is routed to card validation database 140 by OSS 102 via signaling network 130.

If, as in this case, the outcome of decision step 208 is a "YES" decision, the process continues to step 212 in which OSS 102 sends a query to number portability database 150 via signaling link 139 using the billing directory number (hereinafter, "billing information") to determine which line ID database should process the billing validation request.

The process then continues to decision step 214 in which OSS 102 determines whether routing information was received from the number portability database. If the outcome of decision step 214 is a "NO" determination, (as may be the case if the directory number is a non-ported directory number) the process continues to step 216 in which the NPA-NXX digits of the directory number, as provided by the caller, are used to access billing acceptance database 126. Billing acceptance database 126 maintains data which identifies all service providers (by NPA-NXX digits) which allow OSS 102 to access their customer data. In decision step 218, it is determined whether the OSS can access the customer data associated with the service provider identified by the NPA-NXX digits of the billing directory number. In other words, decision step 218 determines whether OSS 102 can handle the processing and billing of this particular call. If the outcome of decision step 218 is a "YES" decision, the process continues to step 220 in which a validation request is sent to a line ID database on the basis of the NPA-NXX directory number digits as provided by the caller. If the outcome of decision step 218 is a "NO" decision, however, the process continues through connector "A" to step 219 in which OSS returns a failure message to the caller.

In this example, the billing directory number account has been ported from a LEC service provider to another service provider, namely, CAP2. Thus, number portability database 150 does return routing information relating to the directory number "708-555-1234". Therefore, the outcome of decision step 214 is a "YES" determination, and the process continues to step 222 in which billing acceptance database 126 is accessed using the first six digits of the LRN (or the NPA-NXX digits) as retrieved from number portability database 150. In decision step 224, it is determined whether the service provider identified by the NPA-NXX digits allows OSS 102 to access its customer data. If the outcome of decision step 224 is a "NO" determination, the process continues through connector "A" to step 219 in which a failure announcement is issued to the caller by announcement facility 110. If the outcome of decision step 224 is a "YES" determination, the process continues to step 226 in which a billing validation request from OSS 102 is routed to a selected one of the plurality of line ID databases in accordance with the routing information retrieved from the number portability database. In this case, OSS 102 routes a billing validation request, via signaling link 139, to selected CAP2 line ID database 146 using the NPA-NXX digits of the LRN received from number portability database 150. Since the routing information is in already in NPA-NXX form, conversion of the routing information by point code converter 118 into an network address of a line ID database is unnecessary. However, point code converter 118 may be employed in alternative embodiments in which the routing information is not in NPA-NXX form.

The process continues to decision step 228 in which OSS 102 determines whether billing validation was received from the accessed database. If the outcome of decision step 228 is a "NO" determination, (that is, OSS 102 receives an "invalid number" message from the database), the process continues to step 219 in which announcement facility 110 returns a failure message to the caller. If the outcome of decision step 228 is a "YES" determination, (that is, OSS 102 receives a "valid number" message from the database), the process continues to step 230 in which the call is routed to the called party associated with the original dialed directory number. Subsequently, in step 231 a billing record relating to this particular call is created for delivery to billing system 120. In this case, a call from the caller is routed via PSTN 190, to a called party at telephone 182 and the ported card directory number account "708-555-1234 is ultimately charged for the call. The process ends in step 232.

Advantageously, the efficiency of the telecommunications network is enhanced as the present invention uses existing number portability resources to route billing validation requests which involve a ported directory number account to an appropriate one of a plurality of line ID databases. Although the above-described process is described with respect to a directory number-based calling card call, it is envisioned that the process may be used each time a caller wishes to bill a call to a ported directory number. The process is described with respect to an LRN form of routing number, but it is envisioned that it may be used with other forms of routing numbers that may be selected by the industry. In addition, the process may be used by other systems which must access one of a plurality of service providers' line ID databases to accomplish other purposes, such as retrieving other calling party name information. The above-described embodiment is for illustrative purposes only. Numerous other arrangements of the invention may be devised by those skilled in the art without departing from the scope of the invention.

What is claimed is:

1. In a telecommunications network including at least one operator services system (OSS) for completing operator-assisted calls, and a plurality of line identification (ID) databases, each line ID database containing billing authorization data for at least one directory number account, a method for billing an operator-assisted call to a directory number account comprises the steps of:

receiving in the OSS an originally dialed directory number and billing information from a caller;

determining that the billing information received from the caller specifies billing a call to a directory number account;

using the billing information received from the caller to access a billing acceptance database to determine if the OSS has access to customer data of a service provider associated with the directory number account specified in the billing information;

if the OSS has access to the customer data of the service provider, routing a billing validation request to one of the plurality of line ID databases based on the billing information received from the caller; and sending a billing record to a billing system so that the directory number account can be billed for the call.

2. The method of claim 1 further comprising the step of:

following the step of determining that the billing information specifies billing a call to a directory number account, using the billing information to query a number portability database which contains routing information associated with the directory number account.

3. The method of claim 2 further comprising the step of:

following the step of querying a number portability database, routing a billing validation request to one of the plurality of line ID databases by using the routing information retrieved from the number portability database.

4. The method of claim 2 wherein the step of routing a billing validation request to one of the plurality of line ID databases comprises the step of:

converting the routing information into a line ID database address.

5. In a telecommunications network comprising an operator services system (OSS) linked to a plurality of line identification (ID) databases via a signaling network wherein the OSS is inter-connected to at least one switch, a method for retrieving information from one of the plurality of line ID databases comprises the steps of:

determining that billing information relating to a call received in the OSS requires accessing a line identification (ID) database for call billing validation;

querying a number portability database to retrieve routing information associated with the billing information;

using the routing information to access a billing acceptance database to determine whether the OSS has access to customer data of a service provider; and if the OSS has access to customer data of the service provider, retrieving information associated with billing validation from a selected line ID database.

6. A telecommunications network comprises:

an operator services system (OSS) for receiving calls from a plurality of switches wherein each of the calls requires billing validation;

a number portability database inter-connected to the OSS by a data link, wherein the number portability database stores routing information relating to ported directory numbers;

a signaling network inter-connecting the OSS with a plurality of line identification (ID) databases, at least two of the line ID databases containing data for directory numbers with the same NPA-XXX;

means for determining whether the OSS has access to the line ID databases; and means for retrieving information associated with billing validation from one of the line ID databases.

* * * * *